Figure 1:
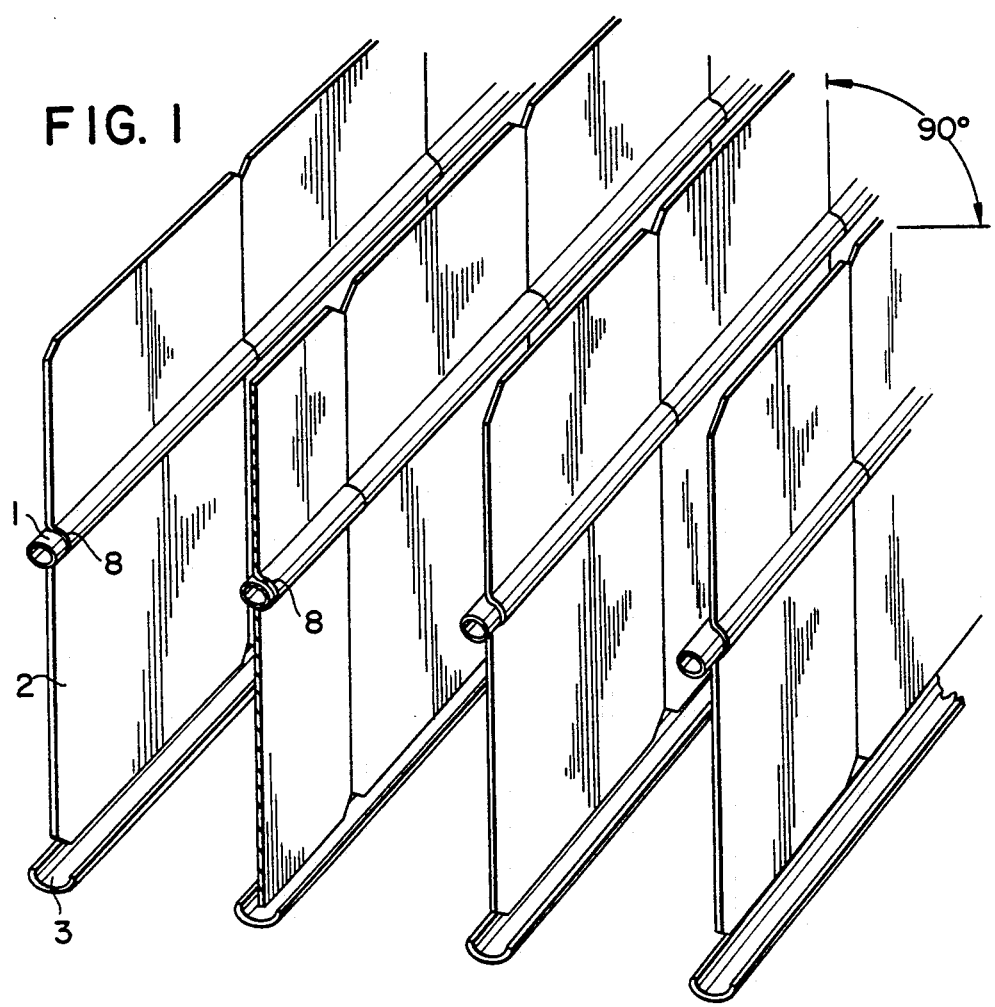

United States Patent [19]  
Reichel et al.

[11] Patent Number: 4,993,630  
[45] Date of Patent: Feb. 19, 1991

[54] SYSTEM FOR TEMPERING SPACES OF A BUILDING

[75] Inventors: Wolfgang Reichel, Iserlohn; Hans H. Timmer, Erkrath, both of Fed. Rep. of Germany

[73] Assignee: Ingenieurbüro Timmer GmbH, Haan, Fed. Rep. of Germany

[21] Appl. No.: 422,096

[22] Filed: Oct. 16, 1989

[30] Foreign Application Priority Data

Mar. 9, 1989 [EP] European Pat. Off. ........ 89104188.1

[51] Int. Cl.$^5$ ................................................ F24F 7/00
[52] U.S. Cl. ........................................ 237/49; 237/70; 237/69; 165/49
[58] Field of Search .............. 237/70, 71, 69, 46, 237/49; 62/285; 165/49; 98/40.07, 40.08

[56] References Cited

U.S. PATENT DOCUMENTS 2,277,462  3/1942  Spofford ............................ 62/285
2,896,426  7/1959  Ayling ............................... 62/285
2,983,115  5/1961  Caswell ............................. 62/285
3,080,914  3/1963  Shippee et al. ..................... 237/70

FOREIGN PATENT DOCUMENTS 495557   9/1950  Belgium ............................. 237/70
1033878  7/1958  Fed. Rep. of Germany ........ 237/70

Primary Examiner—Henry A. Bennett  
Attorney, Agent, or Firm—Goodman & Teitelbaum

[57] ABSTRACT

System for tempering spaces of a building with ceiling or wall constructions of metal or nonmetallic parts which are fastened to the supporting or nonsupporting wall or ceiling of spaces, in which by a heat transport medium conducted through the ceiling or wall construction the parts of the construction facing the interior space of the building are tempered. On at least one pipeline (1) conducting the heat transport medium there are arranged several heat transfer profiles (2), heating conducting, preferably with clamping effect, metallically conducting or in one piece, the effective radiation and convection surface of which is greater than the wall or ceiling surface covered by the system.

19 Claims, 5 Drawing Sheets

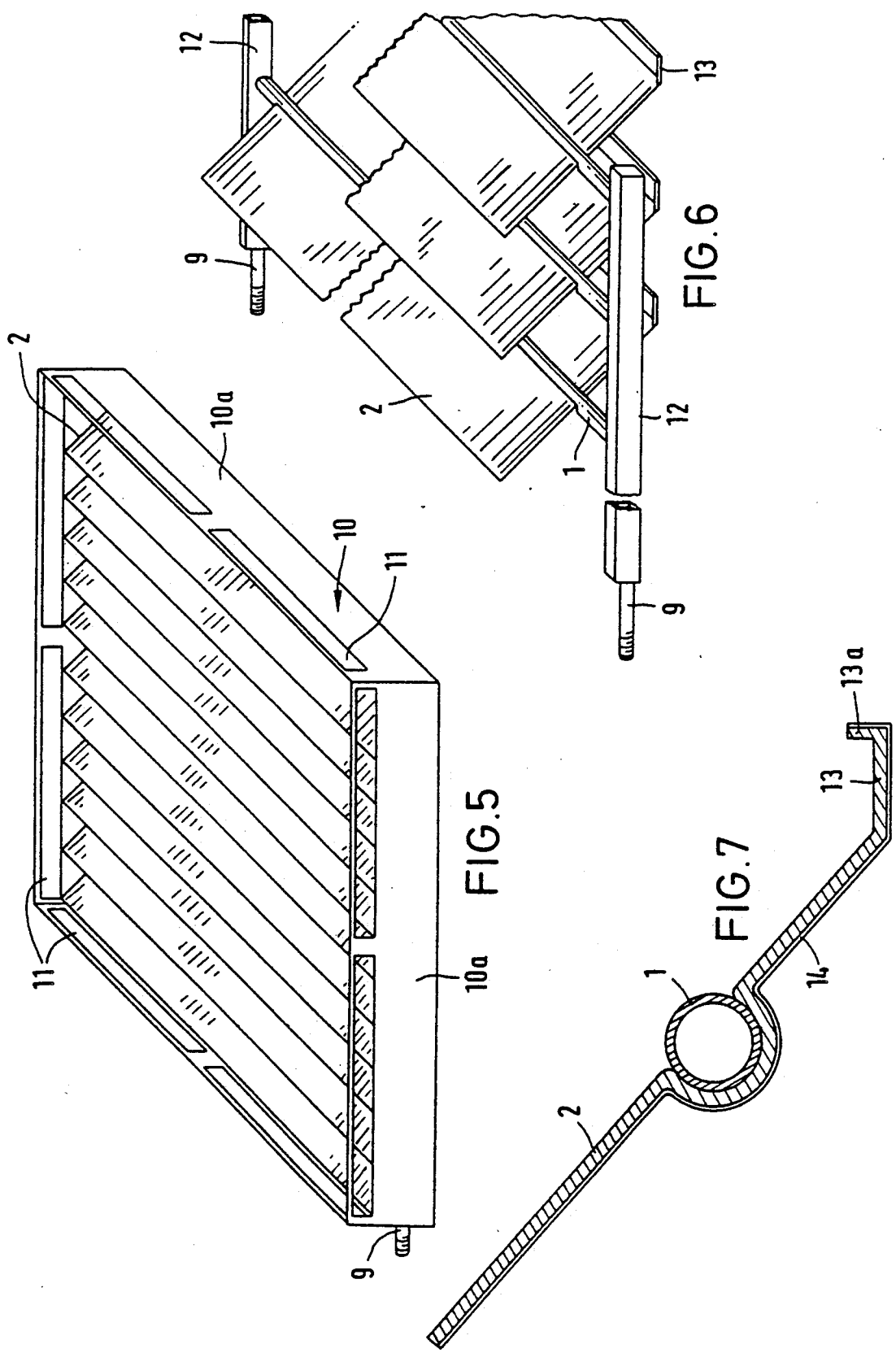

SYSTEM FOR TEMPERING SPACES OF A BUILDING

The present invention relates to a system for tempering spaces of a building with ceiling constructions of metal or nonmetallic parts which are fastened to the supporting or nonsupporting ceiling of spaces, in which parts of the ceiling construction facing the building interior space are tempered by a heat transport medium conducted through the ceiling construction.

Such systems are known as ceiling radiation installations to which heat is supplied over a heat-transport medium, as a rule water.

Known systems are steel tube ceiling heating installations with pipes embedded in concrete in supporting ceilings, copper tube ceiling heating systems with copper pipes in plaster, aluminum lamellar ceiling heating systems with visible or plastered aluminum lamellae, radiation plate ceiling heating installations with steel plates suspended under the carrying construction and pipes welded on or placed in corrugations, hollow-space ceiling installations with pipes laid in ceiling cavities, with and without lamellae.

Ceiling radiation heating installations give off their warmth predominantly (ca. 70%) by radiation to the space, for which reason all the systems contain surfaces directed to the space. Ceiling radiation heating systems are not suited for space cooling because of too-low cooling performance (about 50 W/m$^2$). The low cooling performance results from the cooling water temperature limited to about 17° C. because of sweating on going below the dew point. Furthermore, in ceiling cooling with the known ceiling heating systems the radiation constituent is reduced from ca. 70% to ca. 50% because of the more or less smooth ceiling surfaces necessary for the heating.

Underlying the present invention is the problem of developing ceiling systems with higher cooling performance. According to the invention this is achieved by the features described below, where advantageous executions of the invention are set forth.

All the known disadvantages of air conditioning installations—such as high installation costs, high operating costs, enlarged construction volume for the accommodation of the technology, tension loads, noise annoyances and inconveniences—are therewith avoided.

In the absence of window ventilation of the spaces only a mechanical airing and ventilating system is required to cover the outside-air constituent for the persons.

The convection cooling surfaces of the ceiling cooling system can be arranged over a whole surface in the space or also only in part, depending on the air movement desired, so that a structuring and, accordingly, architectonic formation of the ceiling is possible.

The convection cooling surfaces, constructed, for example as ribs, may be adjustable, in order, when heating operation is desired, to increase the surface constituent facing the space for the purpose of increasing the radiation constituent in the heating operation.

The heat transport occurs in a conventional form over pipelines. As heat transfer medium there serves a suitable fluid, for example water. Heat generation occurs arbitrarily, for example over heating boilers, and cold water generation by means of refrigerating machine or air-water exchanger standing in the open.

The principle of the invention presents, accordingly, a fundamental turning-away from what was hitherto known, namely creation of gentle room cooling by means of radiation and convection surfaces, fixed or adjustable, integrated in ceiling constructions, elimination of brutal air conditioning by air conditioning installations, elimination of extensive construction volumes for the accommodation of air conditioning installations, simple heat transport, space cooling by lead-off of heat to the outer air, elimination of cold generation, saving of installation costs, building costs and operating costs.

With the aid of the examples of execution represented in the appended drawings the invention is now explained in detail.

Figure 2:
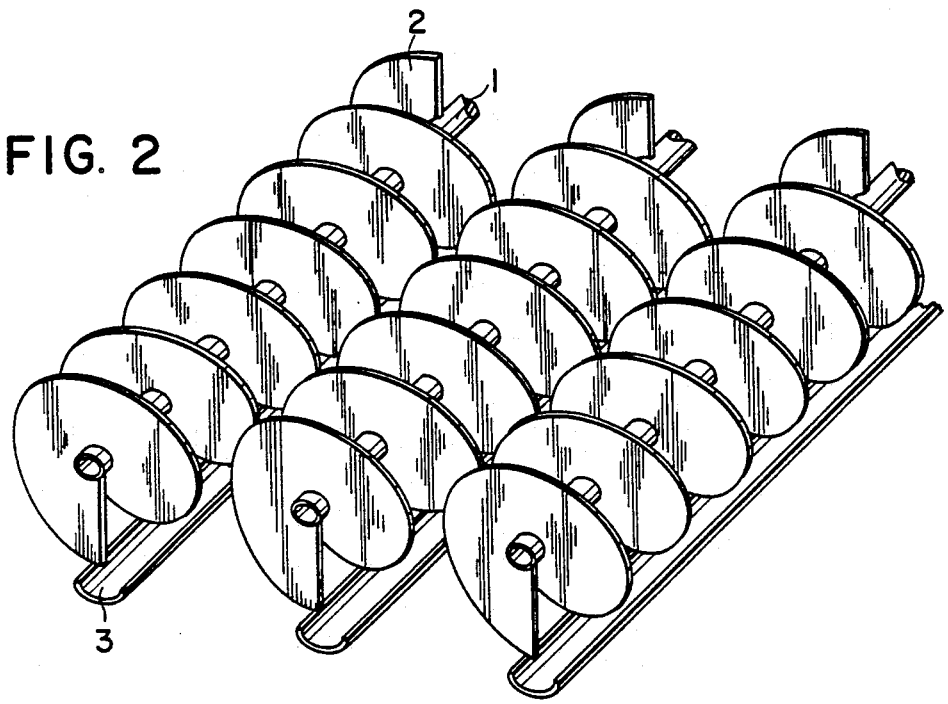
Figure 3:
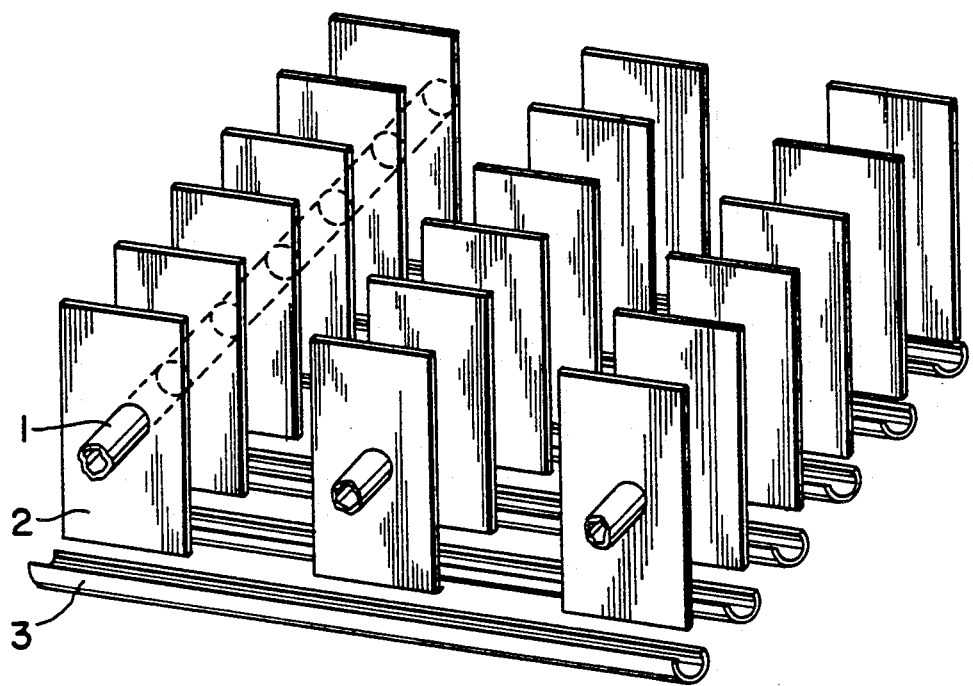
Figure 4:
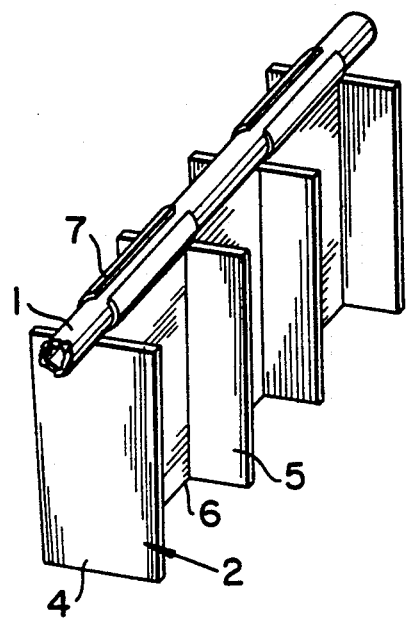
Figure 8:
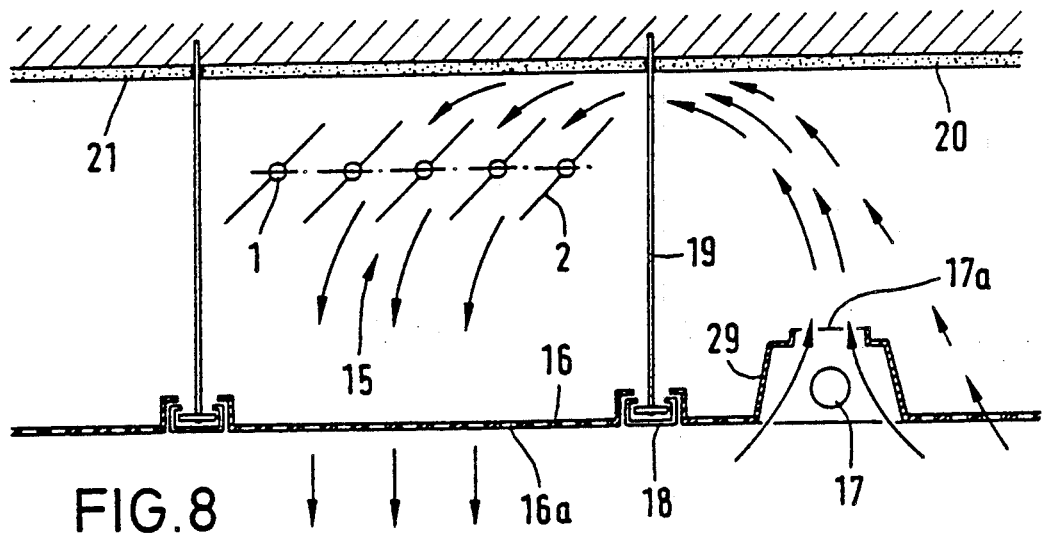
Figure 9:
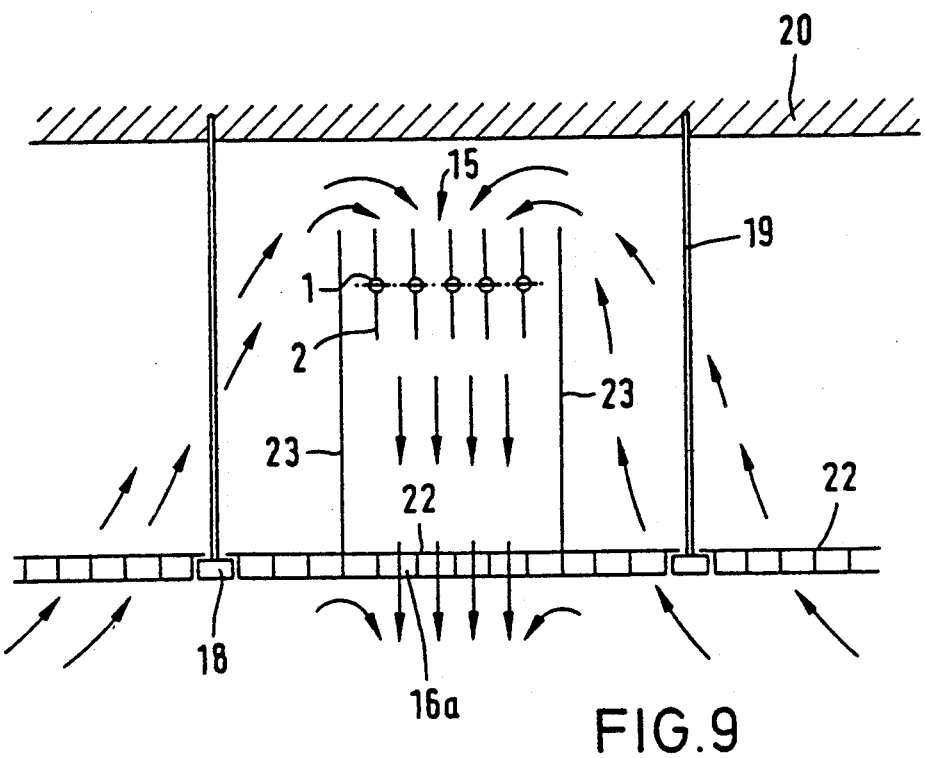
Figure 10:
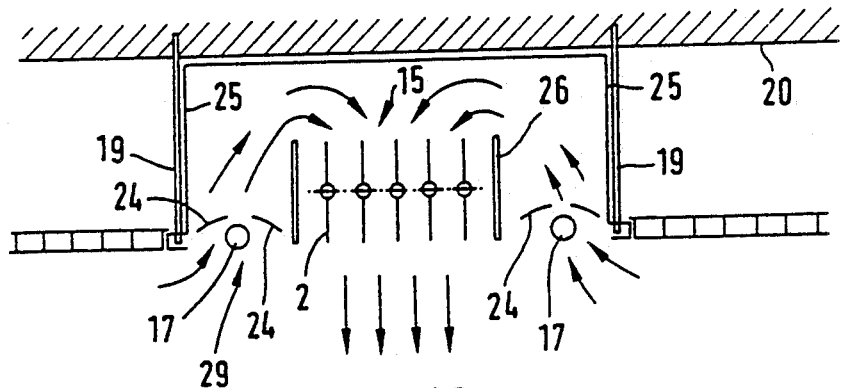
Figure 11:
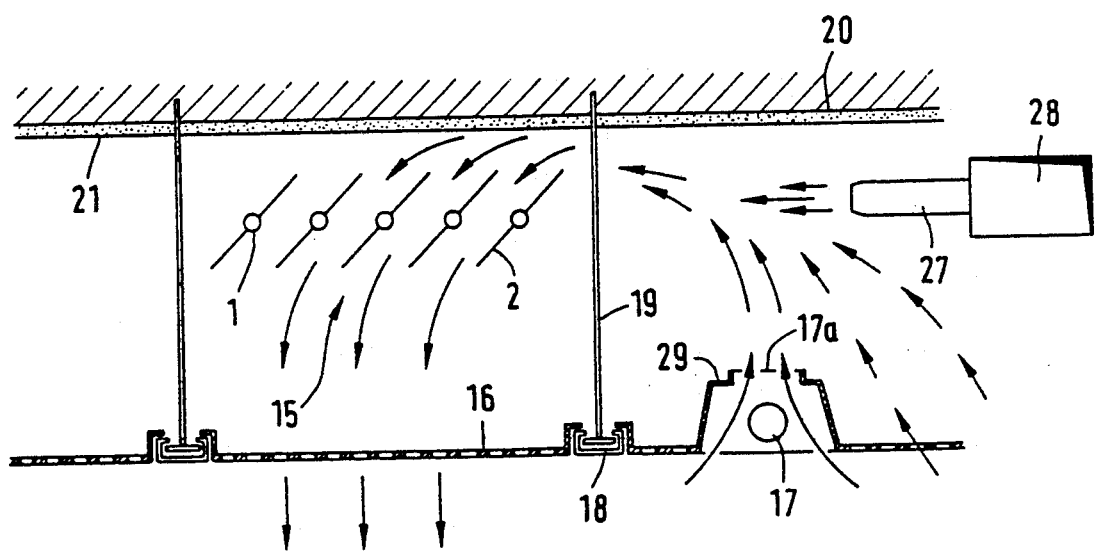

FIG. 1 shows a perspective representation of a system according to the invention;

FIG. 2 a perspective representation of a system according to the invention in an alternative execution;

FIG. 3 a perspective representation of a further development of the system of the invention;

FIG. 4 a perspective representation of a further alternative execution of the system of the invention;

FIG. 5 a perspective representation of another alternative formation of the system of the invention;

FIG. 6 a perspective partial representation of the system according to the invention in an alternative execution;

FIG. 7 a section representation of the system of the invention in an alternative execution;

FIG. 8 a section representation of the system according to the invention in an alternative execution;

FIG. 9 a section representation of the system of the invention in an alternative execution;

FIG. 10 a section representation of the system of the invention in an alternative execution;

FIG. 11 a section representation of the system of the invention in an alternative execution.

As is yielded from FIG. 1, a system according to the invention is shown to consist of a pipeline 1, for example of copper, which is flowed through by a heat-transfer medium, in particular a heat-transport fluid and of heat-transfer profiles 2, in which system the heat-transfer profiles 2 are joined with heat-conducting effect, contact-clamping, metallically or also connected in one piece with the pipeline 1 and are constructed as free-lying convectively active tempering surface. Preferably in each case a large number of heat-transfer profiles 2 are arranged, spaced to one another, on a pipeline, and, namely, in correspondence to the requisite tempering surface. The heat transfer profiles 2 consist preferably of aluminum or copper. For the purpose of adapting the performance to heating or cooling operation, the heat transfer profiles 2 can be fastened to swing through 90 degrees, so that they are adjustable between a vertical position to the tube longitudinal axis and a horizontal position. Here, in the vertical position there is achieved the maximum convection effect and in the horizontal position the least convection effect. Accordingly, the vertical position serves best for the cooling operation and the horizontal position serves best for the heating operation. The swinging of the profiles 2 can occur by turning of the pipeline with the profiles 2 fastened to it or by turning the profiles 2 about the fixed pipeline. By use of known servo motors in conjuction with known regulating thermostats the heating and cooling load can be adapted by swinging of the heat transfer profiles for the particular heat requirement or the particular cooling load of the space. For the lead-off of sweating water in consequence of temperature drop below the dew point in cooling operation, there can advantageously be arranged drop water troughs 3 underneath the vertical profiles 2. Advantageously the heat transfer profiles 2 have a smooth or profiled surface and are constructed in plate form. In the example of execution represented according to FIG. 1 the plate-form profiles have a bulge 8, circular arcuate in cross section, running parallel to a plate edge, which bulge is formed in such a way that the profiles 2 can be slid with this bulge 8 onto the pipeline 1 with clamping effect.

The profiles 2 can also be constructed wholly or partly sound-absorbing on their surface. The heat transfer profiles 2 can also be perforated in double plate form with inside-lying sound-absorbing material. The heat transfer profiles 2 can be arranged in the tube axis or also turned transversely to the tube axis. To the system there can be fastened suspended open ceilings. In vertical arrangement of the pipes the system is also suited for wall installation. For the purpose of reception or lead-off of heat to the outer air the system can also be set up in the open. As heat-transport medium preferably water is used, to which, in a known manner, corrosion-inhibiting additives, or, if necessary, also antifreeze agents are admixed.

In FIG. 2 there is represented an alternative embodiment of the invention. There, a spiral heat-transfer profile 2 is provided which in a simple manner surrounds the pipeline 1 with clamping effect. For the lead-off of sweating water on exceeding of the dewpoint there serves the drop water trough 3.

In FIG. 3 there is represented a further execution of the invention. Here the heat-transfer profiles consist of rectangular plate profiles 2, through the center of which in each case there runs the pipeline 1. The profiles 2 are aligned perpendicular to the tube axis, there being arranged a large number of profiles 2 in succession at a certain spacing to one another. As shown in FIG. 3, the above mentioned drop water trough 3 is also arranged perpendicular to the tube axis below a set of profiles 2.

In FIG. 4 another alternative execution of the invention is represented, in which like parts, as in FIGS. 1 to 3, are provided with the same reference numbers. Here, in contrast to the preceding forms of execution the heat transfer profile 2 is constructed as a ceiling formation part. For this case of the system application arbitrary geometric forms, dimensions and color hues of the profile 2 are individually shapable. In the example of execution represented, three plate profiles 4, 5, 6 form the heat transfer profile. For this the three plate profiles are jointed with one another for example by welding or soldering into a double-T profile. A one-piece production as continuous profile is possible; for the fastening to the pipeline 1 there serves a clamping bar 7 of circular section, which is jointed in closed linkage with heat-conducting effect with the middle plate profile 6 on its upper longitudinal edge, and which is clamped to the pipeline 7, so that there is given a good heat conduction from the pipeline over the clamping strip to the heat transfer profile.

In FIG. 5 there is represented a further alternative execution of the invention, in which likewise like parts as represented in FIGS. 1 to 4 are provided with the same reference numbers.

Here, in contrast to the preceding forms of execution, the heat transfer profiles 2 are arranged in a frame-shaped profile element 10. This consists of individual frame plates 10a, in which, above the upper edge of the heat transfer profiles 2 there are formed air flow openings 11.

The compact system is connected to the cold water main over registering connections 9 and can be mounted directly under an existing ceiling. The air flow openings 11 allow the afterflow of air in consequence of downward-directed flow under the heat transfer profiles 2. The obliquely set heat transfer profiles 2 form downward a finite view surface which absorbs a radiation portion of heat transfer. The favorable effect to lowering the enclosing-surface temperature for comfort is thereby realized.

In FIG. 6 there is shown a perspective partial representation of a compact system described under FIG. 5.

The pipelines 1 which have heat transfer profiles 2 issue with their ends in distributor lines 12, which are connected over the register connections 9 to the cold water main.

In addition, the heat transfer profiles 2 receive a lower angling-off portion 13 parallel to the pipelines 1, which functions as sweat water receiver and leads off the possible condensate occurring.

In FIG. 7 there is represented a heat transfer profile 2 which presents the lower angling-off portion 13 provided with an end-side vertical turn-up portion 13a.

In the embodiment represented the heat transfer profiles 2 have the same width as the frame element 10. According to the invention it is likewise possible to provide narrower profiles 2 and to arrange several profiles 2 next to one another.

In order to prevent the situation that on the heat transfer profile underside sweat water arises and can drip, the underside of the heat transfer profile 2 is provided with a coating or lacquering 14 which builds up a temperature gradient and raises the heat transfer profile temperature on the underside by 1 to 2 K. and thus offers an additional security with respect to the dew point.

In FIG. 8 there are shown heat transfer profiles 2 arranged in the ceiling cavity, executed as register 15.

A lower closure of the ceiling cavity is formed, for example, by ceiling panels 16 with a certain free cross section. In these panels 16 there can be installed, for example, lights 29. The panels 16 resting only loosely on a carrier construction 18 are fastened over threaded rods 19 to a crude ceiling 20. Underneath the crude ceiling 20 there can be applied a heat insulation or noise-proofing coating 21.

If the lights 29 are preferably executed as exhaust-air lights with upper openings 17a, the warm air flowing into the ceiling cavity receives an additional upward drive in consequence of heat development of the illuminating means 17. The air flowing over the cooled heat transfer profiles 2 is cooled in consequence of the convective heat transfer and thereby obtains a downward-directed flow component. The panels 16 provided, in particular, with a certain constituent of air passages 16a to permit the flow of the downward-directed air stream. Simultaneously the panels 16 cool off and can absorb a constituent of radiation energy from the space.

In FIG. 9 there is represented a further form of execution of the invention, in which the heat transfer profiles 2 are arranged in vertical position in the ceiling cavity above, for example, an open grating ceiling 22.

The warm air flowing into the ceiling cavity is cooled in flowing past the cooled heat transfer profiles 2; correspondingly, the density of the air increases and the air sinks downward.

Through register partitions 23 which are arranged on both sides of the register 15 of heat transfer profiles 2, this downward-directed air stream is separated from the adjacent upward-directed air stream—see arrows shown in the drawing. The part of the grating ceiling 22 lying under the heat transfer profiles 2 cools off and can absorb radiation energy from the space. The register walls 23 extend preferably from the ceiling 16 to the upper edge of the heat transfer profiles 2.

In FIG. 10 there is shown an advantageous compact ceiling installation unit, consisting of illumination with illuminating means 17 and possible reflectors 24 as well as the heat transfer profiles 2.

The installation unit is separated by side walls 25 from the ceiling cavity.

From the crude ceiling 20 the compact unit can be suspended over threaded rods 19.

The warmed space air flowing through the lights 29 obtains through the illuminating means 17 an additional upward drive and is cooled on flowing over the heat transfer profiles 2 and thus falls again into the space.

The registers 15 of heat transfer profiles 20 are separated from the illumination zones by lateral boardary walls 26 which simultaneously provide for the shaft effect of the descending cooler air stream. Besides the compensation of the lighting heat load, therewith there is additionally possible the cooling of the space.

This advantageous illumination cooling unit can be integrated into any ceiling construction.

In FIG. 11 there is shown another form of application of the heat transfer profiles 2 in conjunction with a nozzle jet system for the introduction of fresh air.

For this individual nozzle 27 are arranged in a channel distributing system 28 in the ceiling cavity. The nozzle jet directed transversely to the heat transfer profiles 2 injects warm air flowing from the space into the ceiling cavity and drives it over the cooled heat transfer profiles 2. In consequence of cooling on the heat transfer profiles 2 the originally warm air now falls again through the panels 16 into the space. Also possible is an improved forced flow improved by injection from lights 29.

The ceiling cavity can be closed off toward the crude ceiling 20 again by a heat insulation or antinoise coating 21.

Like parts in FIGS. 1 to 11 are provided with the same reference numbers.

The invention is not restricted to the examples of execution shown, but comprises all means equivalently functioning in the sense of the invention. It also likes within the scope of the invention to integrate the heat transfer profiles 2 in the space lights, inflow air outlets and air discharge arrangements, likewise also with vertical or oblique arrangement in walls, windows or room installation components, such as, for example, furniture. The fastening of the profiles 2 can also occur over pipe straps or the like. Advantageously the profiles are spaced and dimensioned in such a way that in the swingable execution when the profiles 2 occupy a position in which they all lie in the same plane a closed radiation surface is generated by the profiles 2.

We claim:

1. System for tempering spaces of a building with ceiling or wall constructions of metal or nonmetallic parts which are fastened to supporting or nonsupporting wall or ceiling of the spaces, in which through a heat transport medium conducted through the ceiling or wall construction the parts of the construction facing the interior space of the building are tempered, said system comprising:
   at least one pipeline (1) conducting the heat transport medium;
   several heat transfer profiles (2) being arranged on said pipeline (1);
   said heat transfer profiles (2) having a substantially rectangular, plate-form construction;
   said heat transfer profiles (2) being spaced from one another or lying immediately one after another;
   said heat transfer profiles (2) being joined to said pipeline (1) in a heat-conducting arrangement by clamping or metallically or in a one-piece construction with said pipeline (1);
   an effective radiation and convection heat transfer surface of said heat transfer profiles (2) being greater than that of the wall or ceiling surface covered by the system;
   said heat transfer profiles (2) being arranged as registers (15) over a suspended ceiling (16, 22) and below the ceiling or wall constructions; and
   said suspended ceiling (16, 22) having air passages (16a) therethrough;
   whereby the basic heat transfer of the system is effected by convection caused by said heat transfer surface of said heat transfer profiles (2) being greater than that of the wall or ceiling surface covered by the system.

2. System for tempering spaces of a building with ceiling or wall constructions of metal or nonmetallic parts which are fastened to supporting or nonsupporting wall or ceiling of the spaces, in which through a heat transport medium conducted through the ceiling or wall construction the parts of the construction facing the interior space of the building are tempered, said system comprising:
   at least one pipeline (1) conducting the heat transport medium;
   several heat transfer profiles (2) being arranged on said pipeline (1);
   said heat transfer profiles (2) being joined to said pipeline (1) in a heat-conducting arrangement by clamping or metallically or in a one-piece construction with said pipeline (1);
   an effective radiation and convection surface of said heat transfer profiles (2) being greater than that of the wall or ceiling surface covered by the system;
   said heat transfer profiles (2) being arranged as registers (15) over a suspended ceiling (16, 22);
   said suspended ceiling (16, 22) having air passages (16a) therethrough; and
   lights (29) having upper outlet openings (17a) being arranged laterally offset to said registers (15) in said suspended ceiling (16, 22) parallel to said pipelines (1).

3. System for tempering spaces of a building with ceiling or wall constructions of metal or nonmetallic parts which are fastened to supporting or nonsupporting wall or ceiling of the spaces, in which through a heat transport medium conducted through the ceiling or wall construction the parts of the construction facing the interior space of the building are tempered, said system comprising:
   at least one pipeline (1) conducting the heat transport medium;
   several heat transfer profiles (2) being arranged on said pipeline (1);

said heat transfer profiles (2) being joined to said pipeline (1) in a heat-conducting arrangement by clamping or metallically or in a one-piece construction with said pipeline (1);

an effective radiation and convection surface of said heat transfer profiles (2) being greater than that of the wall or ceiling surface covered by the system;

said heat transfer profiles (2) being arranged as registers (15) over a suspended ceiling (16, 22);

said suspending ceiling (16, 22) having air passages (16a) therethrough;

register walls (23, 26) being arranged on both sides of said registers (15) parallel to said pipelines (1); and said register walls (23, 26) extending from said suspended ceiling (16, 22) to an upper edge of said heat transfer profiles (2).

4. System according to claim 1, characterized in that the heat transfer profile (2) is arranged to swing about the tube axis of the pipeline (1).

5. System according to claim 4, characterized in that the heat transfer profile (2) is swingably mounted on the fixed pipeline (1), or the pipeline is borne turnably about its longitudinal axis.

6. System according to claim 1, characterized in that for the lead-off of sweat water drop-water troughts (3) are arranged in dripping direction underneath the heat transfer profiles (2).

7. System according to claim 1, characterized in that the heat transfer profile (2) is arranged parallel to the tube axis and/or transversely, or perpendicularly to the tube axis.

8. System according to claim 1, characterized in that the heat transfer profiles (2) have a circular arcuate bulge (8) running parallel to a profile edge thereof, with which the heat transfer profiles are fastened with clamping effect, embrace the pipeline (1).

9. System according to claim 1, characterized in that the heat transfer profiles (2) run obliquely to the pipeline axis and parallel to one another and present on their lower end an angling-off parallel to the pipeline with a turn-up perpendicular hereto.

10. System according to claim 1, characterized in that several pipelines (1) are arranged in succession with sections parallel to one another and in each case with their ends in distributor lines (12).

11. System according to claim 10, characterized in that several line sections arranged in succession are arranged in a frame profile element (10) which is formed of frame plates (10a).

12. System according to claim 11, characterized in that the frame element is formed of frame plates (10a) in which air flow openings are construced above the upper edge of the heat transfer profiles (2).

13. System according to claim 1, characterized in that the heat transfer profile (2) has a smooth or profiled surface.

14. System according to claim 1, characterized in that the heat transfer profiles (2) have a plastic coating.

15. System according to claim 1, characterized in that the heat transfer profiles (2) are constructed sound-absorbing.

16. System according to claim 1, characterized in that the heat transfer profiles (2) are arranged underneath the pipeline (1) and are fastened to the pipeline by means of fastening means (7) with heat-conducting effect on the profile edge facing the pipeline.

17. System according to claim 16, characterized in that the fastening means are constructed as fastening bars (7) surrounding the pipeline (1).

18. System according to claim 17, characterized in that to one fastening bar there are fastened several heat transfer profiles (2).

19. System according to claim 1, characterized in that to the side of the registers (15) there are arranged air outlet nozzles (27) in such a way that their outlet flow direction runs transversely to the heat transfer profiles (2).

* * * * *